United States Patent [19]
Eggertsen

[11] 3,753,654
[45] Aug. 21, 1973

[54] METHOD FOR DETERMINING ORGANIC MATERIALS IN WATER

[75] Inventor: Frank T. Eggertsen, Orinda, Calif.
[73] Assignee: Shell Oil Company, New York, N.Y.
[22] Filed: July 14, 1971
[21] Appl. No.: 162,691

Related U.S. Application Data

[63] Continuation-in-part of Ser. No. 013,416, Feb. 24, 1970, abandoned.

[52] U.S. Cl....... 23/230 PC, 23/230 M, 23/253 PC, 23/253 R, 23/232 E, 23/254 EF, 23/255 E
[51] Int. Cl...................... G01n 33/18, G01n 25/20
[58] Field of Search.................. 23/230 PC, 253 PC, 23/232, 254; 73/29

[56] References Cited
UNITED STATES PATENTS
3,567,391  3/1971  Lysyj et al. ..................... 23/253 PC

*Primary Examiner*—Morris O. Wolk
*Assistant Examiner*—R. E. Serwin
*Attorney*—Theodore E. Bieber et al.

[57] ABSTRACT

A method for estimating the amount and volatility of organic materials in contaminated water samples wherein a sample of the contaminated water is moved into a heated furnace and the vapors swept directly into a flame-ionization detector.

5 Claims, 7 Drawing Figures

Patented Aug. 21, 1973

INVENTOR:
F. T. EGGERTSEN

CURVES FOR DISTILLED WATER AND STANDARD ISOPROPYL ALCOHOL SOLUTIONS

CURVE FOR OIL IN WATER

INVENTOR:
F. T. EGGERTSEN

Patented Aug. 21, 1973

CURVE FOR STREET WATER

CURVE FOR SEA WATER

CURVE FOR REFINERY EFFLUENT

INVENTOR:
F. T. EGGERTSEN

METHOD FOR DETERMINING ORGANIC MATERIALS IN WATER

RELATED PATENT APPLICATION

The present invention is a continuation-in-part of application Ser. No. 013,416, filed Feb. 24, 1970 now abandoned, which utilizes an apparatus similar to that disclosed in a copending application of the same inventor entitled "Microanalyzer for Thermal Studies," Ser. No. 617,337, filed Feb. 20, 1967 now U.S. Pat. No. 3,574,549.

BACKGROUND OF THE INVENTION

The present invention relates to a method for detecting small quantities of organic materials in water, particularly contaminated water samples taken from rivers, bays, plant effluents and similar bodies of water. The problem of pollution of water supplies has increased in recent years and the need for quick and accurate methods for determining the presence of contaminants is desirable. In addition to the capability of handling a large number of samples, the process should be relatively low cost and simple to operate in order that relatively unskilled personnel may be employed in conducting analyses. Some of the most common pollutants of water supplies are industrial products and wastes, particularly in the chemical and petroleum industries. As is well kwown, at times upsets or other casualties occur in processes that result in the dumping of quantities of industrial products or the accidental discharge of quantities of industrial products into water supplies or water-covered areas, as for example, bays, rivers and such.

Normally, the pollutants are present in water supplies in very small quantities, for example, in the range of a few parts per million (ppm) and thus sensitive equipment is required to effectively measure the quantity of pollutants. In the past various types of chromatographic devices have been designed for detecting and measuring the quantity of pollutants present in water supplies. While gas chromatographic devices provide a detailed analysis of the contaminants present in the water sample, they are limited to a determination of relatively volatile organic material that can be eluted through the gas chromatographic column. Also the chromatographic process separates the components so that only the major contaminants are observed; minor components, each at a few parts per million, usually cannot be observed.

Other methods for determining organic carbon include: extraction techniques to concentrate the contaminants, followed by various methods of analysis; oxidation techniques, followed by in infrared determination of $CO_2$ or $CO$; and a pyrographic method in steam carrier gas using a flame ionization detector to determine the organic material. These methods are either laborious or require rather elaborate equipment and/or techniques.

SUMMARY OF THE INVENTION

The present invention represents a simpler approach to the determination of the organic contaminants in water and at the same time provides a type of thermal analysis to differentiate the contaminants according to volatility. Organic contaminants in water samples are determined by utilizing a furnace to evaporate the sample of the water at a controlled rate. Control of the evaporation rate is necessary in order to vaporize the sample rapidly, (for sensitivity and high speed of analysis) and yet is not vaporized so rapidly that the detector does not operate properly. In the case of the flame ionization detector, too rapid vaporization may extinguish the detector flame. The vapors evaporated with the water are transported to a detector that is specific for organic materials to provide a measure of the volatile organics. The furnace is then heated to a high temperature to volatilize the remaining organic material, which is also determined by the detector.

While the invention may use other types of detectors, hydrogen flame-ionization detectors are particularly adaptable to the invention because of their sensitivity to organic material and their lack of response to water and other inorganic compounds. A suitable gas flow scheme is required for supplying hydrogen and air to the detector, and a suitable carrier gas. The invention may utilize nitrogen, hydrogen or various other carrier gases to sweep the evolved vapors into the flame-ionization detector.

The furnace used may be of various designs, for example, it may consist of a Vycor furnace closely coupled to the flame jet of the flame ionization detector. The furnace should be capable of being heated at least to 500°C to volatilize the sample; and the flame ionization detector must be heated sufficiently to prevent condensation of organic volatiles enroute to the detector. The sample container may be a platinum or other suitable vessel. It is held in a probe connected to a push rod to allow the sample to be inserted into the center of the furnace.

BRIEF DESCRIPTION OF THE DRAWINGS

The present invention will be more easily understood from the following detailed,description of preferred embodiments when taken in conjunction with the attached drawings in which.

DESCRIPTION OF PREFERRED EMBODIMENTS

Figure 1:
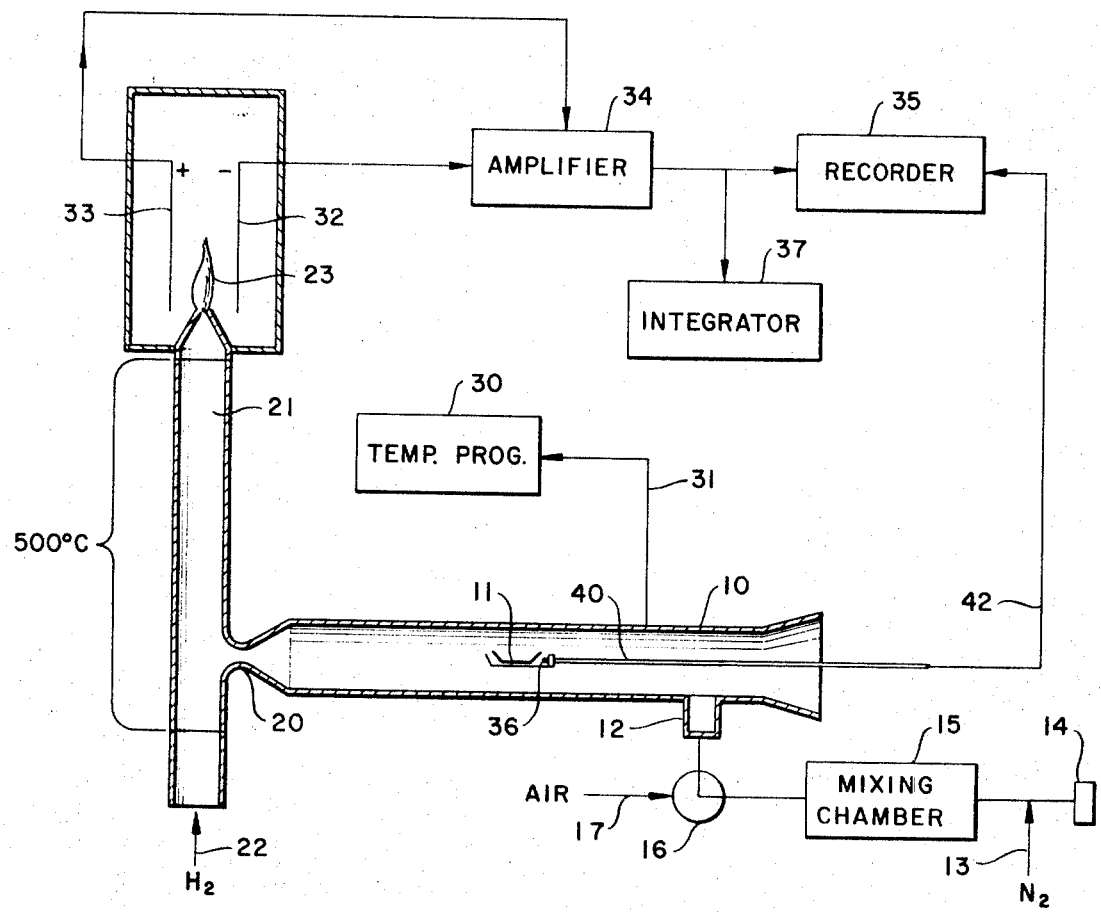
FIG. 1 illustrates an apparatus constructed according to this invention.
Figure 2:
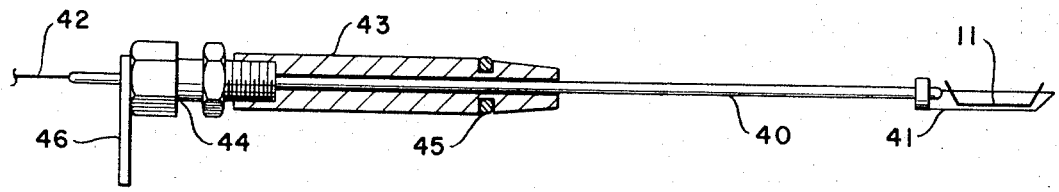
FIG. 2 illustrates the sample probe member in detail.

Referring now to FIG. 1, there is shown a furnace 10 which incorporates a heating means. The heating means may be a conventional resistance heater which is disposed or wound on the outer surface of the furnace. The furnace may be formed of various materials, for example, Vycor or other high temperature glass. The furnace incorporates suitable means for supporting a sample pan 11 and a means for inserting and withdrawing the sample pan from the interior of the furnace. Details of a suitable retractable probe are shown in FIG. 2. The furnace is provided with a gas inlet 12 through which a carrier gas is supplied for sweeping the vapors evolved from the sample out of the furnace and into the detector. The gas inlet 12 is connected to a source of an inert gas, for example nitrogen 13. The nitrogen flows into a mixing chamber 15 and from the mixing chamber to a valve 16 which communicates with the inlet 12 of the furnace. The valve 16 is also provided with an inlet for supplying air from a source 17 to the furnace in order that the furnace may be purged of contaminants to keep the system clean. Also connecting with the mixing chamber 15 is a means 14 for introducing a suitable standard gas, for example butane, to calibrate the response of the detector. For example, the means may consist of a septum which may be pierced by a hypodermic needle to inject measured amounts of the standard gas. The outlet 20 of the furnace communicates directly with the detector 21 which is preferably a flame-ionization detector. The coupling of the furnace directly to the detector is important since it substantially eliminates the condensation of evolved volatiles. The detector is supplied with a combustible gas, as for example pure hydrogen, from a source 22 at its lower end and is provided with a burner tip 23 at its upper end. The detector jet 21 is supplied with suitable heating means to maintain its temperature at a suitably high level, preferably 500°C, to prevent condensation or deposition of volatiles evolved from the sample. Since flame-ionization detectors are well known, their construction and operation will not be described further. The detector described in the above-referenced copending application could be used.

The two electrodes 32 and 33 of the flame-ionization detector are coupled to an amplifier 34 in order that the signal may be amplified and then supplied to recording equipment 35 and an integrator 37 if desired. As is well known, the quantity of material evolved from the sample as measured by the flame-ionization detector is related to the area under the peak of the signal. Thus, it may be desirable at times to use an integrator 37 to integrate the area under the peaks of the detector signal.

The temperature of the furnace is controlled by temperature controller 30 which is coupled to the furnace by means of a lead 31. The actual temperature of the furnace is measured by a thermocouple 36 which is coupled to the recorder 35 in order that the temperature of the furnace may be recorded in relation to or in correlation with the signal from the detector.

The probe is shown in detail in FIG. 2 and uses a rod 40 to support the sample pan 11 by means of a frame member 41. A thermocouple is disposed on the frame to measure the temperature of the sample pan. The thermocouple lead 42 passes out through the center of the support rod. The support rod is a sliding fit in stopper 43 having a packing gland 44 or other sealing means at one end. The outer surface of the stopper is sealed to the furnace wall by means of an "O" Ring 45. An adjustable stop 46 is provided for positioning the sample pan in the furnace.

OPERATION

The temperature of the well-purged furnace is heated to a preselected temperature in the range of 50° – 180°C by suitable adjustment of the voltage to the heater windings.. The pan containing the sample is inserted into the cool inlet of the furnace while the flame detector is lit and gas flow established. The sample is then thrust into the furnace to evaporate the water in the sample along with the lighter organic or hydrocarbon materials. The vapor from the sample pan will be conveyed from the furnace by the inert gas flow and into the flame-ionization detector where any organic materials will be detected. By proper selection of the initial furnace temperature the evaporation will proceed smoothly and will not interfere with the operation of the flame detector. After the water and the light organic materials have been evolved, the temperature of the furnace is raised to the desired maximum temperature to evolve the remaining organic material from the sample. The heating rate can vary over a wide range, but is preferably rapid in order to observe the volatiles as a sharp peak. Raising the temperature from 150°C to a maximum of 550°C over a period of five minutes has been found to give satisfactory results. A slower heating rate will, of course, provide a more precise measure of volatiles yields vs. temperature.

The organic content of the sample is determined from peak areas by measuring these areas (planimeter or integrator) and applying a calibration factor determined by analysis of a standard solution. Alternatively, the calibration factor can be determined by injecting a standard gas sample. Water reduces the detector response somewhat, and accordingly a different calibration factor is applied to area obtained during the evaporation step from that for the 150°–550° heating step.

According to Hill and Newell (Nature, 206, 708 (1965) addition of water vapor to a carrier gas gradually reduced the carbon response of a flame ionization detector until, with 10 percent water vapor the response was reduced by 30 percent. In the present method the carbon response was reduced by about 25 percent for organic material evolved during evaporation of 50 $\mu$l of water at the rate of 10 $\mu$l per minute.

The calibration factors are applied to the net areas, that is, the areas obtained above that for a distilled water blank. For amounts above a few parts per million, the water blank is generally insignificant. The yield of organic material may be broken down according to volatility, that is, "volatile" material evolved with the water and "non-volatile" material obtained at higher temperatures. Also, a breakdown of the non-volatile material may be obtained, if desired, by computing yield vs. temperature data from the curve obtained.

Figure 3:
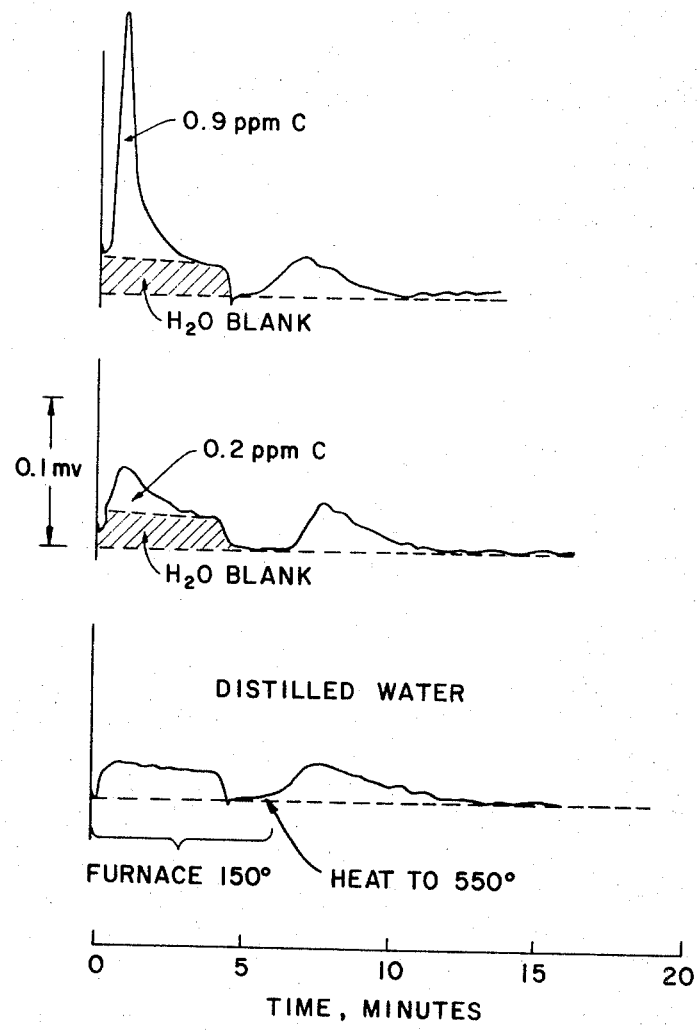
FIGS. 3–7 illustrate the analysis of various samples containing organic contaminants.

Referring now to FIGS. 3, 4, 5 and 6 and Table 1, there is shown representative results with the instrument shown in FIG. 1 and described above. These analyses were made under the following conditions:

Carreir gas: nitrogen at 30 ml per minute
Hydrogen for the detector, at 25 ml per minute
Sample size: 50 ml contained in platinum pan of 0.1 ml capacity
Heating schedule: set voltage to heater windings for initial temperature of 150°C; after 5 to 8 minutes heat to 550°in 5 minutes
Detector: Modified Varian-Aerograph flame ionization detector, at 500°C.
Sensitivity, $6 \times 10^{-11}$A = 1 mv.
Recorder: 1 mv = full scale FIG. 3 illustrates the recorded curve for a pure water blank, as well as those for water containing trace quantities of a volatile organic compound, isopropyl alcohol. These curves show that as little as 0.2 ppm of organic carbon can be observed above the pure water baseline. The results for various concentrations of isopropyl alcohol shown in Table 1 demonstrate the accuracy of the method over the concentration range 0.2 ppm to 22 ppm. The values shown were determined using the detector response calibration factor for butane and adjustment of this factor according to the literature value for the response of isopropyl alcohol relative to that for butane.

Figure 4:
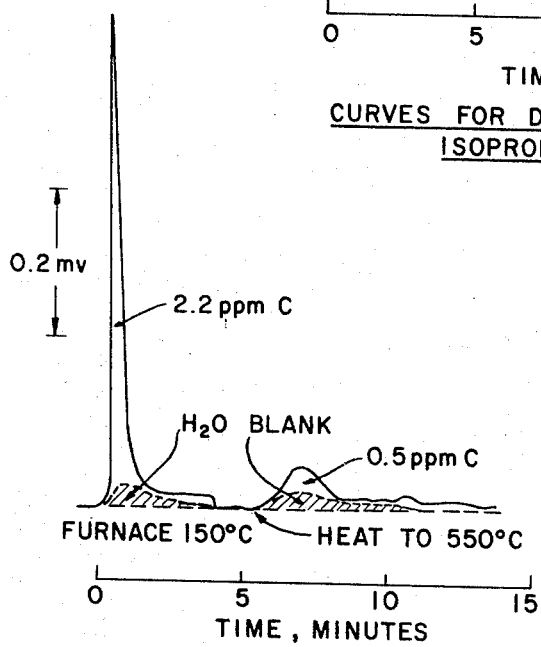

FIG. 4 illustrates application of the method of an oil-containing sample made by adding 9 ppm of an oil to distilled water and shaking the mixture to disperse and dissolve the oil. The results shown are expressed as parts per million of organic carbon based on calibration with butane. A small amount of non-volatile organic (0.5 ppm) was observed as well as 2.2 ppm of volatile material.

Figure 6:
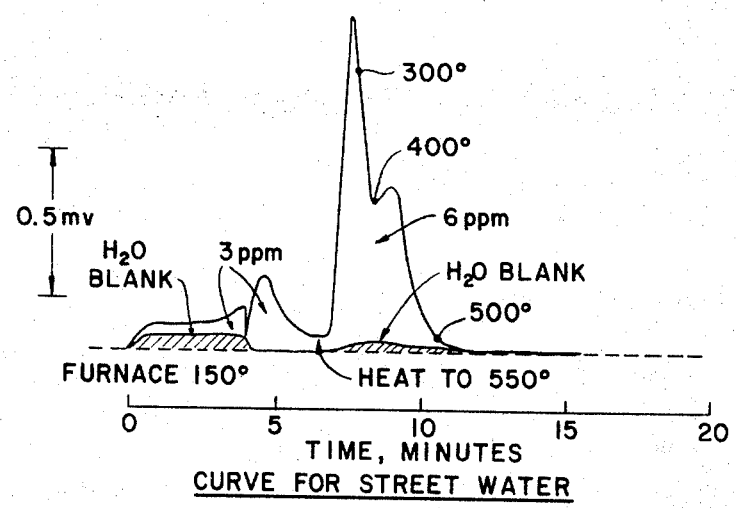
Figure 7:
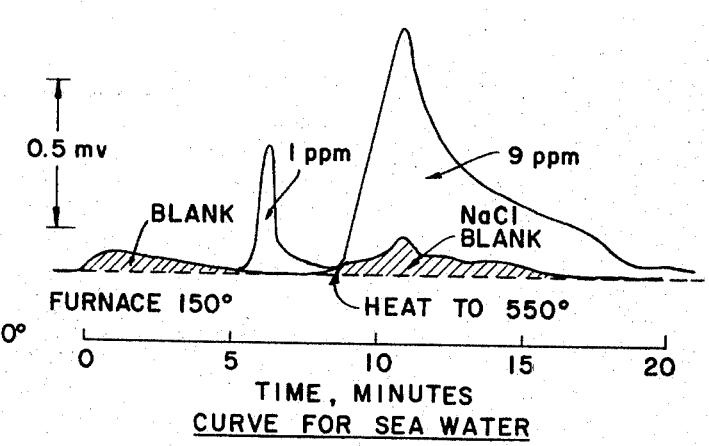
Figure 5:
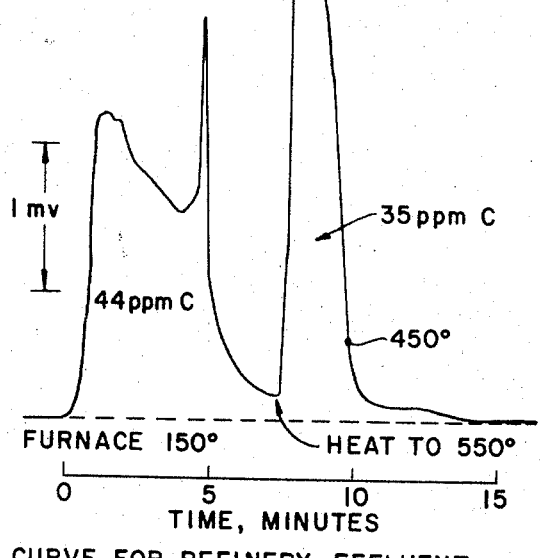

FIGS. 5, 6 and 7 show applicability of the method of a refinery effluent, contaminated water from a city street and sea water from the San Francisco Bay, respectively. The sea water was analyzed in admixture with 40 mg of C-22 firebrick granules (42–60 mesh), which had been fired to red heat to destroy organic matter. The purpose of the firebrick was to prevent spattering of the residual inorganic material as the sample is dried; this spattering tends to produce fine salt particles which are carried into the flame detector and produce a noisy signal.

TABLE 1

Analysis of Aqueous Isopropyl Alcohol Solutions

Sample size: 50µl

| Present, ppm Isopropyl Alcohol | Total C | Test Results, ppm |
|---|---|---|
| 36.4 | 21.8 | 23 |
| 7.3 | 4.3 | 4.1, 4.0 |
| 2.8 | 1.7 | 1.8 |
| 1.4 | 0.87 | 0.8, 0.8 |
| 0.73 | 0.44 | 0.5, 0.5 |
| 0.30 | 0.18 | 0.3 |

In some analyses hydrogen is to be preferred over nitrogen as a carrier gas, particularly for determining traces of non-volatile organic material obtained after the water has been evaporated. The improved results are believed due to the reducing action of hydrogen on trace oxidants in the sample furnace and the sample itself. This prevents oxidation of organic carbon and the resulting loss in yield of organic carbon observed in the flame ionization detector. The following table illustrates the difference in results usng nitrogen and hydrogen as carrier gases:

| | | Organic Carbon ppm | |
|---|---|---|---|
| | Carrier | Volatile | Non-volatile |
| Distilled Water | Nitrogen | 0.1 | 0.2 |
| | Hydrogen | 0.1 | 1.3 |
| Tap Water | Nitrogen | 0.1 | 0.3 |
| | Hydrogen | 0.1 | 2.8 |

Also the depression of the detector response due to water evaporated from the sample, mentioned above, can be eliminated by suitably adjusting the ratio of the nitrogen and hydrogen gas flows fed to the detector. After such optimization it is then possible to use the same carbon response factor to evaluate the peak areas for the volatile and non-volatile organic material.

For application of the method to salt waters a further improvement in performance can be obtained by using alumina for supporting the sample in place of the fire brick mentioned above. When fire brick is used high results are sometimes obtained owing to interferences, presumably from volatile inorganic salts which respond in the flame detector. The substitution of alumina has been found to produce more accurate results, particularly with sea water samples. The following results were obtained for representative sea water samples.

Sample: 50 microliters on about 100 mg of Alcoa F-20 alumina in platinum sample pan
Carrier Gas: Hydrogen
Heating Schedule: Evaporate in 5 min. in 100°C furnace then heat to 550°C at 30°/min.

| Sample | <110° | 110°–400° | 400°–500° | Sum | Sum corr. for blank | Beckman TOC |
|---|---|---|---|---|---|---|
| Sea water (blank) | <0.2 | 0.7 | 2.8 | 3.5 | | <2 |
| Sea water plus fuel oil | 2.2 | 2.8 | 6.3 | 11.3 | 7.8 | 10 |
| Sea water plus crude oil | 1.6 | 9.3 | 6.3 | 17.2 | 13.7 | 14 |
| Sea water plus crude oil | 2.3 | 8.3 | 12.4 | 23.0 | 19.5 | 21 |

NOTE.—The Beckman TOC refers to a total carbon analyzer manufactured by Beckman Instruments of Richmond, California.

I claim:

1. A method for estimating the amount and volatility of organic materials present in an aqueous solution, said method comprising:
charging a sample of the aqueous solution to a furnace while maintaining the furnace at a temperature sufficiently high to vaporize all of said water at a controlled rate;
sweeping the vapor discharge from the furnace by means of a carrier gas directly to a detector capable of detecting organic carbon and supplying a signal related thereto;
recording the signal from said detector, to provide a measure of the volatile organic material vaporized with the water at said furnace temperature;
raising the temperature of the furnace at a programmed rate to volatilize and/or pyrolyze residual organic matter in the sample;
recording the signal from the detector as the temperature of the furnace is raised to provide a measure of the amount of said residual organic matter.

2. The method of claim 1 wherein an inert gas is used to convey the sample through the furnace.

3. The method of claim 1 wherein the temperature of the furnace is maintained at 50° to 180°C when said water is supplied to said furnace and raised to about 500° to 800°C when said residual organic matter is volatilized.

4. The method of claim 1 wherein the detector is a hydrogen flame ionization detector maintained at above 300°C.

5. The method of claim 1 wherein the carrier gas is hydrogen.

* * * * *